United States Patent
Oota

(10) Patent No.: US 8,617,771 B2
(45) Date of Patent: Dec. 31, 2013

(54) MEMBRANE ELECTRODE ASSEMBLY, MANUFACTURING METHOD THEREOF AND FUEL CELL

(75) Inventor: Masashi Oota, Tokyo (JP)

(73) Assignee: Toppan Printing Co., Ltd. (JP)

( * ) Notice: Subject to any disclaimer, the term of this patent is extended or adjusted under 35 U.S.C. 154(b) by 726 days.

(21) Appl. No.: 12/714,271

(22) Filed: Feb. 26, 2010

(65) Prior Publication Data

US 2010/0221639 A1  Sep. 2, 2010

(30) Foreign Application Priority Data

Mar. 2, 2009 (JP) ................. 2009-047561

(51) Int. Cl.
*H01M 8/00* (2006.01)
*H01M 8/10* (2006.01)
*H01M 4/02* (2006.01)
*H01M 4/36* (2006.01)

(52) U.S. Cl.
USPC ........... 429/535; 429/483; 429/523; 29/623.5

(58) Field of Classification Search
USPC .............. 429/535, 482, 483, 484, 523, 623.1, 429/623.5; 29/623.1, 623.5
See application file for complete search history.

(56) References Cited

U.S. PATENT DOCUMENTS 5,620,807 A * 4/1997 Mussell et al. ................ 429/514
8,304,130 B2 * 11/2012 Morita .......................... 429/483

FOREIGN PATENT DOCUMENTS

| JP | 08-162123 | 6/1996 |
| JP | 2003-197218 | 7/2003 |
| JP | 2005-108770 | 4/2005 |
| JP | 2005-294123 | 10/2005 |
| JP | 2006-012449 | 1/2006 |

OTHER PUBLICATIONS

Notification of Reasons for Refusal issued by JPO for appl. no. 2009-047561, dispatched Aug. 6, 2013, 4 pgs.
Translation of the Notification of Reasons for Refusal issued by JPO for appl. no. 2009-047561, dispatched Aug. 6, 2013, 8 pgs.

* cited by examiner

*Primary Examiner* — Patrick Ryan
*Assistant Examiner* — Julian Anthony
(74) *Attorney, Agent, or Firm* — Squire Sanders (US) LLP

(57) ABSTRACT

A manufacturing method of MEA of the present invention includes coating a catalyst ink for first electrode catalyst layer containing an electron conducting material loading a catalyst, a polymer electrolyte, and a solvent on a substrate to form a coated layer; removing the solvent in the coated layer to form at least two types of first electrode catalyst layers having different polymer electrolyte content ratios; coating an electrolyte ink containing the polymer electrolyte and the solvent on the first electrode catalyst layer to form a coated layer; removing the solvent in the coated layer to form a polymer electrolyte layer; coating a catalyst ink for second electrode catalyst layer containing the electron conducting material loading the catalyst, the polymer electrolyte, and the solvent on the polymer electrolyte layer to form a coated layer; and removing the solvent in the coated layer to form a second electrode catalyst layer.

5 Claims, 3 Drawing Sheets

MEMBRANE ELECTRODE ASSEMBLY, MANUFACTURING METHOD THEREOF AND FUEL CELL

CROSS REFERENCE TO RELATED APPLICATION

This application is based on and claims the benefit of priority from the Japanese Patent Application number 2009-047561, filed on Mar. 2, 2009, the entire contents of which are incorporated herein by reference.

BACKGROUND OF THE INVENTION

1. Field of the Invention

The present invention relates to a membrane electrode assembly (also referred to as an MEA), a manufacturing method thereof and a fuel cell using the MEA. In particular, the present invention relates to an MEA which has two first electrode catalyst layers as stacked layers different in polymer electrolyte content ratio, and a manufacturing method thereof and a fuel cell (especially, PEFC: polymer electrolyte fuel cell or PEMFC: proton exchange membrane fuel cell) using the MEA.

2. Description of the Related Art

Fuel cells are power generation systems which produce electric power along with heat. A fuel gas including hydrogen and an oxidant gas including oxygen reacts together at electrodes containing catalyst so that the reverse reaction of water electrolysis takes place in a fuel cell. Fuel cells are attracting attention as a clean energy source of the future since they have advantages such as a small impact on the environment and a low level of noise production relative to conventional power generation systems. Fuel cells are divided into several types according to the employed ion conductor. A fuel cell which uses an ion-conductive polymer membrane is called a PEFC or PEMFC.

Among various fuel cells, a PEFC (or PEMFC), which can be used at around room temperature, is considered as a promising fuel cell for use in a vehicle and a household stationary power supply etc. and is being developed widely in recent years. A joint unit which has a pair of electrode catalyst layers on both sides of a polymer electrolyte membrane and which is called a membrane electrode assembly (MEA) is arranged between a pair of separators, on which either a gas flow path for supplying a fuel gas including hydrogen to one of the electrodes or a gas flow path for supplying an oxidant gas including oxygen to the other electrode is formed, in the PEFC (PEMFC). The electrode for supplying a fuel gas is called a fuel electrode or cathode (electrode), whereas the electrode for supplying an oxidant gas is called an air electrode or anode (electrode). Each of the electrodes includes an electrode catalyst layer, which has stacked polymer electrolytes with carbon particles on which a catalyst such as a noble metal of platinum group is loaded, and a gas diffusion layer which has gas permeability and electron conductivity.

Conventionally, various manufacturing methods of membrane electrode assembly have been studied to improve the fuel cell performance. Examples of the manufacturing method of membrane electrode assembly include a method in which a catalyst layer is formed as an electrode by coating a coating solution containing a catalyst onto the ion-exchange membrane and the electrode and the ion-exchange membrane are joined by a heat treatment such as hot press to prepare the membrane electrode assembly, a method in which a catalyst layer is formed on a substrate film that is prepared independently of an ion-exchange membrane and the ion-exchange membrane is stacked on the catalyst layer to transfer the catalyst layer onto the ion-exchange membrane by the hot press, a method in which an electrode sheet in which the catalyst layer is formed is prepared on a gas diffusion layer to join the electrode sheet to the ion-exchange membrane, and a method in which two sets of half cells in which the catalyst layer is formed on the ion-exchange membrane are prepared, surfaces of the ion-exchange membrane sides are pressure-bonded while faced to each other, thereby preparing the membrane electrode assembly.

However, because the membrane electrode assembly produced by the conventional methods is prepared by the thermal pressure bonding such as the hot press when joining the ion-exchange membrane and the electrode catalyst layer, the thermal pressure bonding process becomes a bottleneck, and a tact time is lengthened, which unfortunately degrades production efficiency.

<Patent document 1> JP-A-2003-197218
<Patent document 2> JP-A-2005-294123
<Patent document 3> JP-A-2005-108770

On the other hand, in a sequentially stacking type MEA (Membrane Electrode Assembly) in which a first electrode catalyst layer is prepared on a substrate, a polymer electrolyte layer is prepared, and finally a second electrode catalyst layer is prepared, the producing cost is reduced because the tact time is shortened to enhance the production efficiency. However, a polymer electrolyte invades into the porous first electrode catalyst layer to reduce a void, and therefore a MEA gas diffusion property is degraded and flooding is easily generated.

As to the sequentially stacking type MEA technique, for example, JP-A-2003-197218, JP-A-2005-294123, and JP-A-2005-108770 disclose the method in which the first electrode catalyst layer is prepared on the substrate, the polymer electrolyte layer is prepared, and finally the second electrode catalyst layer is prepared. Specifically, JP-A-2003-197218 and JP-A-2005-294123 disclose that a drying process is required in order to prevent the polymer electrolyte from invading in and mixing with the first electrode catalyst layer. JP-A-2005-108770 discloses that a drying speed is defined to prevent the polymer electrolyte from invading in the first electrode catalyst layer. However, in the techniques disclosed in JP-A-2003-197218, JP-A-2005-294123, and JP-A-2005-108770, it is difficult to prevent the polymer electrolyte from invading in the first electrode catalyst layer, the void is reduced, and therefore the MEA gas diffusion property is degraded and the flooding is easily generated.

SUMMARY OF THE INVENTION

The present invention is to provide a membrane electrode assembly which has the high producing efficiency and the gas diffusion property is improved to hardly generate flooding, a producing method thereof, and a fuel cell that includes the membrane electrode assembly to have high power generation performance.

A first aspect of the present invention is a method for manufacturing a membrane electrode assembly (MEA) which includes coating a catalyst ink for forming a first electrode catalyst layer containing an electron conducting material and/or a catalyst loaded electron conducting material, a polymer electrolyte and a solvent on a substrate to form a first coated layer, evaporating the solvent in the first coated layer to form at least two first electrode catalyst layers which have a difference in polymer electrolyte content ratio, coating an electrolyte ink containing a polymer electrolyte and a solvent on the first electrode catalyst layer to form an electrolyte coated layer, evaporating the solvent in the electrolyte coated layer to form a polymer electrolyte layer, coating a catalyst ink for forming a second electrode catalyst layer containing the catalyst loaded electron conducting material, the polymer electrolyte and the solvent on the polymer electrolyte layer to form a second coated layer, and evaporating the solvent in the second coated layer to form a second electrode catalyst layer.

A second aspect of the present invention is the method according to the first aspect of the present invention, wherein a layer included in the first electrode catalyst layer which is arranged adjacent to the polymer electrolyte layer is a filler layer having a polymer electrolyte content ratio which is obtained from a formula 1 below and is 1.2-5.0 times as large as that of a layer included in the first electrode catalyst layer which is arranged adjacent to the substrate.

(polymer electrolyte content ratio)=(weight of polymer electrolyte)/(weight of electron conducting material)     :<formula 1>

A third aspect of the present invention is the method according to the second aspect of the present invention, which further includes preparing two types of catalyst inks in which the electron conducting material and/or the catalyst loaded electron conducting material and the polymer electrolyte are dispersed in the solvent and which have a difference in a content ratio of the polymer electrolyte to a content of the electron conducting material and/or the catalyst loaded electron conducting material, coating one of the two types of catalyst inks which has the lower content ratio of the polymer electrolyte to a content of the electron conducting material and/or the catalyst loaded electron conducting material on the substrate and drying to form the layer included in the first electrode catalyst layer which is arranged adjacent to the substrate, coating the other of the two types of catalyst inks which has the higher content ratio of the polymer electrolyte to a content of the electron conducting material and/or the catalyst loaded electron conducting material on the layer included in the first electrode catalyst layer which is arranged adjacent to the substrate and drying to form the filler layer.

A fourth aspect of the present invention is the method according to the third aspect of the present invention, wherein the polymer electrolyte included in the catalyst ink for forming the first electrode catalyst layer is the same as the polymer electrolyte included in the electrolyte ink.

A fifth aspect of the present invention is the method according to the fourth aspect of the present invention, wherein a thickness of the first electrode catalyst layer is 10 μm or less.

A sixth aspect of the present invention is an MEA which includes a polymer electrolyte layer, a first electrode catalyst layer and a second electrode catalyst layer, the first electrode catalyst layer being arranged on a surface of the polymer electrolyte layer, the second electrode catalyst layer being arranged on the other surface of the polymer electrolyte layer, the first electrode catalyst layer including an electron conducting material and/or a catalyst loaded electron conducting material and a polymer electrolyte, and the first electrode catalyst layer comprising at least two types of layers which have a difference in polymer electrolyte content ratio A seventh aspect of the present invention is the MEA according to the sixth aspect of the present invention, wherein a layer included in the first electrode catalyst layer and arranged adjacent to the polymer electrolyte layer is a filler layer having a polymer electrolyte content ratio which is obtained from a formula 2 below and is 1.2-5.0 times as large as that of another layer included in the first electrode catalyst layer.

(polymer electrolyte content ratio)=(weight of polymer electrolyte)/(weight of electron conducting material)     :<formula 2>

An eighth aspect of the present invention is the MEA according to the seventh aspect of the present invention, wherein two types of layers are included in the first electrode catalyst layer.

A ninth aspect of the present invention is the MEA according to the eighth aspect of the present invention, wherein the polymer electrolyte included in a catalyst ink for forming the first electrode catalyst layer is the same as a polymer electrolyte included in an electrolyte ink for forming the polymer electrolyte layer.

A tenth aspect of the present invention is the MEA according to the ninth aspect of the present invention, wherein a thickness of the first electrode catalyst layer is 10 μm or less.

A eleventh aspect of the present invention is a fuel cell which has the MEA according to claim 10, a pair of gas diffusion layers and a pair of separators, the MEA being interposed between said pair of gas diffusion layers, and the pair of gas diffusion layers being interposed between the pair of separators.

According to the present invention, the producing efficiency is enhanced, and the first electrode catalyst layer has the structure in which the filler layer having the high polymer electrolyte content ratio is stacked. Therefore, the present invention can provide the membrane electrode assembly, in which the polymer electrolyte does not invade in the porous first electrode catalyst layer having the low content ratio of the polymer electrolyte that contributes to the reaction and the MEA (membrane electrode assembly) gas diffusion property is enhanced to hardly generate the flooding, and the producing method thereof.

Accordingly, the present invention can provide the producing method of the membrane electrode assembly in which advantageously the contact between the polymer electrolyte layer and the electrode catalyst layer is improved to reduce the ion resistance compared with MEA prepared by the hot press MEA. The present invention can also provide the fuel cell having the high producing efficiency and the high power generation characteristic.

DESCRIPTION OF REFERENCE NUMERALS AND SIGNS

1: Polymer electrolyte layer, 1": Electrolyte ink, 1': Coated layer, 2: First electrode catalyst layer, 2': Catalyst ink for first electrode catalyst layer, 2': Coated layer, 3: Filler layer, 3": Catalyst ink for filler layer, 3': Coated layer, 4: Second electrode catalyst layer, 4": Catalyst ink for second electrode catalyst layer, 4': Coated layer, A: MEA (=Membrane electrode assembly), S: Substrate, 5: Gas diffusion layer on fuel electrode, 6: Gas diffusion layer on air electrode, 7: Fuel electrode (Anode), 8: Air electrode (Cathode), 9: Gas flow path, 10: Cooling water path, 11: Separator

DETAILED DESCRIPTION OF THE INVENTION

A membrane electrode assembly (MEA) according to an embodiment of the present invention, a manufacturing method thereof, and a fuel cell will be described below. The present invention is not limited to the following embodiments, but various modifications of the design can be made based on the knowledge of those skilled in the art, and the embodiments with the modifications should be included in the scope of the present invention.

Figure 1A:
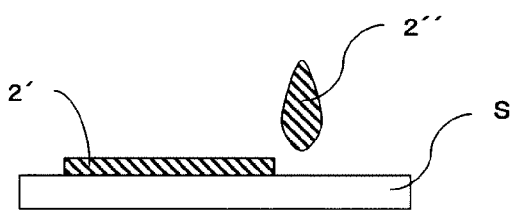
FIG. 1A to FIG. 1J illustrate schematic cross sectional diagrams of manufacturing process of an MEA of the present invention.
Figure 1B:
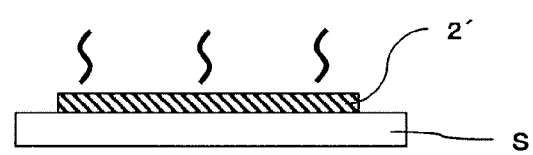
Figure 1C:
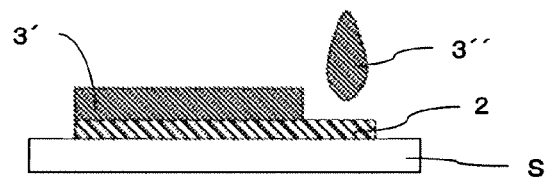
Figure 1D:
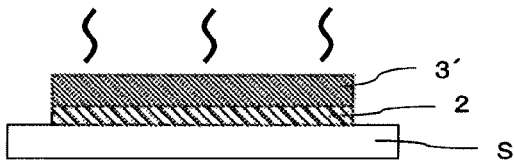
Figure 1E:
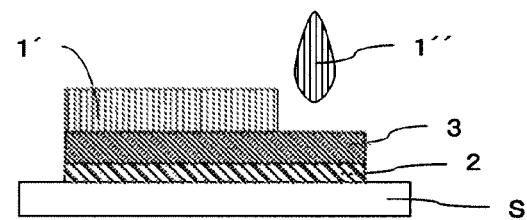
Figure 1F:
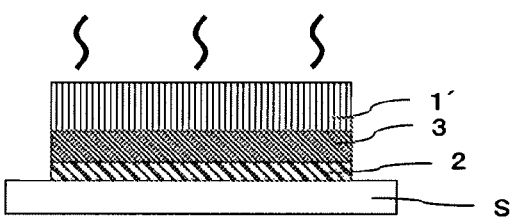
Figure 1G:
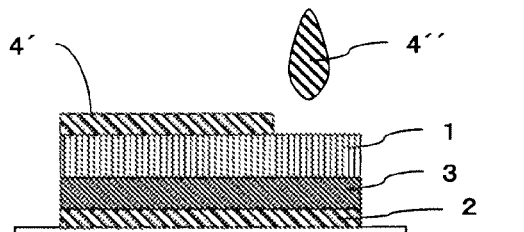
Figure 1H:
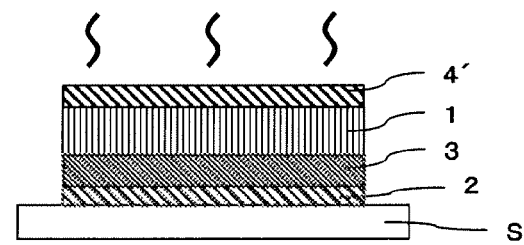
Figure 1I:
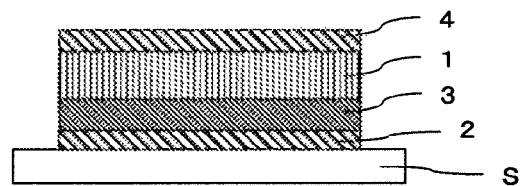
Figure 1J:
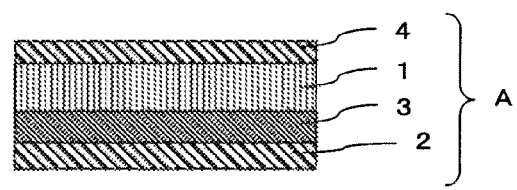

FIGS. 1A to 1J are schematic sectional diagrams illustrating processes of a manufacturing method of a membrane electrode assembly (MEA) according to an embodiment of the present invention. As illustrated in FIG. 1J, a membrane electrode assembly A according to an embodiment of the present invention includes a polymer electrolyte layer 1, a filler layer 3 provided on one of surfaces of the polymer electrolyte layer 1, a first electrode catalyst layer 2 provided on the filler layer 3, and a second electrode catalyst layer 4 provided on the other surface of the polymer electrolyte layer 1.

In the membrane electrode assembly A according to an embodiment of the present invention, the polymer electrolyte layer 1 can sufficiently be joined to the filler layer 3 on the first electrode catalyst layer 2 and the second electrode catalyst layer 4 to decrease ion resistance of an interface between the polymer electrolyte layer 1 and the first electrode catalyst layer 2 including the filler layer 3 and ion resistance of an interface between the polymer electrolyte layer 1 and the second electrode catalyst layer 4.

Hereinafter, the manufacturing method of the membrane electrode assembly A will be described with reference to FIGS. 1A to 1J.

As illustrated in FIG. 1A, a substrate S is prepared, catalyst ink for first electrode catalyst layer 2" containing an electron conducting material loading a catalyst, a polymer electrolyte, and a solvent is prepared, and the catalyst ink for first electrode catalyst layer 2" is coated onto the substrate S to form a coated layer 2'.

As illustrated in FIG. 1B, the solvent in the coated layer 2' including the catalyst ink for first electrode catalyst layer 2" coated onto the substrate S is removed to form the first electrode catalyst layer 2 on the substrate S.

As illustrated in FIG. 1C, catalyst ink for filler layer 3" containing the electron conducting material loading the catalyst and/or the electron conducting material which does not load the catalyst, the polymer electrolyte, and the solvent is prepared, and the catalyst ink for filler layer 3" is coated onto the first electrode catalyst layer 2 formed in advance to form a coated layer 3'.

As illustrated in FIG. 1D, the solvent in the coated layer 3' including the catalyst ink for filler layer 3" coated onto the first electrode catalyst layer 2 is removed to form the filler layer 3 on the first electrode catalyst layer 2.

As illustrated in FIG. 1E, catalyst ink 1" containing the polymer electrolyte and the solvent is prepared, and the catalyst ink 1" is coated onto the filler layer 3 to form a coated layer 1'.

As illustrated in FIG. 1F, the solvent in the coated layer 1' including the electrolyte ink 1" coated onto the filler layer 3 is removed to form the polymer electrolyte layer 1 on the filler layer 3.

As illustrated in FIG. 1G, catalyst ink for second electrode catalyst layer 4" containing the electron conducting material loading the catalyst, the polymer electrolyte, and the solvent is prepared, and the catalyst ink for second electrode catalyst layer 4" is coated onto the polymer electrolyte layer 1 to form a coated layer 4'.

The solvent in the coated layer 4' including the electrolyte ink for second electrode catalyst layer 4" coated onto the polymer electrolyte layer 1 is removed as illustrated in FIG. 1H, and the second electrode catalyst layer 4 is formed on the polymer electrolyte layer 1 by removing the solvent in the coated layer 4' as illustrated in FIG. 1I.

Finally, as illustrated in FIG. 1J, the substrate S is peeled off to form the membrane electrode assembly A including the first electrode catalyst layer 2, the filler layer 3, the polymer electrolyte layer 1, and the second electrode catalyst layer 4. When a gas diffusion layer or a separator is used as the substrate S, it is not necessary to peel off the substrate S from the membrane electrode assembly A.

In the manufacturing method of the membrane electrode assembly A according to an embodiment of the present invention, the first electrode catalyst layer 2, the filler layer 3, the polymer electrolyte layer 1, and the second electrode catalyst layer 4 can sequentially be stacked to extremely enhance the producing efficiency, and the membrane electrode assembly A can be produced at low cost.

In the manufacturing method of the membrane electrode assembly A according to an embodiment of the present invention, the hot press process can be eliminated compared with the conventional manufacturing method of membrane electrode assembly in which the electrode catalyst layer is transferred to both surfaces of the polymer electrolyte layer by the hot press. When the hot press process is eliminated, the decrease in film strength or the decrease in ion-exchange performance due to the damage of the polymer electrolyte layer 1 by the heating or pressure during the hot press can be prevented.

In the membrane electrode assembly A according to an embodiment of the present invention, a film thickness of the polymer electrolyte layer 1 located between one set of electrode catalyst layers can be thinned. In the conventional manufacturing method of membrane electrode assembly in which the electrode catalyst layer formed on the gas diffusion layer is transferred to both surfaces of the polymer electrolyte layer by the hot press, the carbon fiber contained in the gas diffusion layer breaks into the electrode catalyst layer and the polymer electrolyte layer to generate the gas leakage during the hot press, which results in problems in that a circuit voltage of the membrane electrode assembly is lowered and a short circuit is generated in generating the electric power. Therefore, when the membrane electrode assembly is produced by the method for transferring the electrode catalyst layer to both surfaces of the polymer electrolyte layer by the hot press, it is necessary to increase the film thickness of the polymer electrolyte layer.

On the other hand, in the manufacturing method of the membrane electrode assembly A according to an embodiment of the present invention, the hot press process can be eliminated to decrease the film thickness of the polymer electrolyte layer 1 to be formed. Specifically, the thickness of the polymer electrolyte layer 1 can be set to 20 μm or less. In the membrane electrode assembly A in which the polymer electrolyte layer 1 has the decreased film thickness, the power generation characteristic can be improved by the decrease in film resistance.

In the manufacturing method of the membrane electrode assembly A according to an embodiment of the present invention, preferably the filler layer 3 is stacked in the first electrode catalyst layer in which two types of electrode catalyst layers having different polymer electrolyte content ratios are stacked. In the filler layer 3, a polymer electrolyte content ratio of the electrode catalyst layer, obtained by (weight of polymer electrolyte)/(weight of electron conducting material), of the side which comes into contact with the polymer electrolyte layer 1 becomes 1.2 to 5.0 times as large as that of the side of the substrate S. Therefore, the electrode catalyst layer on the side which comes into contact with the polymer electrolyte layer 1 constitutes the filler layer 3, the polymer electrolyte does not invade and mix to the first electrode catalyst layer 2 on the side of the substrate S in coating the electrolyte ink, and the gas diffusion property can be enhanced to hardly generate the flooding in the membrane electrode assembly A. In the membrane electrode assembly A according to an embodiment of the present invention, at least three types of electrode catalyst layers whose polymer electrolyte content ratios are different from one another may be stacked. In such cases, the polymer electrolyte content ratio of the electrode catalyst layer on the side which comes into contact with the polymer electrolyte layer 1, that is, the polymer electrolyte content ratio of the filler layer 3 may be 1.2 to 5.0 times as large as that of the other electrode catalyst layer on the side of the substrate S. In consideration of the producing efficiency, as illustrated in FIG. 1, particularly preferably two types of electrode catalyst layers having different polymer electrolyte content ratios are stacked.

In the manufacturing method of membrane electrode assembly according to an embodiment of the present invention, preferably the first electrode catalyst layer forming process includes a process for forming two types of catalyst inks in which the electron conducting material loading the catalyst material and/or the electron conducting material and the polymer electrolyte are dispersed in the solvent and which having a difference in content ratio of the polymer electrolyte to the electron conducting material; a process for coating one of the two types of catalyst inks which has the lower content ratio of the polymer electrolyte onto the substrate, and drying to form the electrode catalyst layer on the side which comes into contact with the substrate; and a process for coating the other of the two types of catalyst inks which has the higher content ratio of the polymer electrolyte onto the electrode catalyst layer on the side which comes into contact with the substrate, and drying to form the filler layer, and the first electrode catalyst layer having the higher polymer electrolyte is formed on the polymer electrolyte layer side. Particularly, the filler layer is formed using the catalyst ink containing the electron conducting material which does not load the catalyst, which allows the membrane electrode assembly of the present invention to be produced at low cost.

In the manufacturing method of the membrane electrode assembly A according to an embodiment of the present invention, preferably the polymer electrolyte contained in the first catalyst ink 2″, the polymer electrolyte contained in the catalyst ink for filler layer 3″, the polymer electrolyte contained in the electrolyte ink 1″, and the polymer electrolyte contained in the catalyst ink for second electrode catalyst layer 4″ are made of an identical material. These catalyst inks contain the identical polymer electrolyte, whereby the joining between the polymer electrolyte layer 1 and the first electrode catalyst layer 2 including the filler layer 3 and the joining between the polymer electrolyte layer 1 and the second electrode catalyst layer 4 can be improved, and the ion resistances can be reduced at the interface between the polymer electrolyte layer 1 and the first electrode catalyst layer 2 including the filler layer 3 and the interface between the polymer electrolyte layer 1 and the second electrode catalyst layer 4.

That is, through the manufacturing method of the membrane electrode assembly A according to an embodiment of the present invention, the membrane electrode assembly A has the higher production efficiency, the sufficient joining between the polymer electrolyte layer 1 and the first electrode catalyst layer including the filler layer 3 and between the polymer electrolyte layer 1 and the second electrode catalyst layer 4, the low ion resistances at the interface between the polymer electrolyte layer 1 and the first electrode catalyst layer 2 including the filler layer 3 and the interface between the polymer electrolyte layer 1 and the second electrode catalyst layer 4, and the low-cost, sufficient power generation performance.

The membrane electrode assembly A according to an embodiment of the present invention and the manufacturing method thereof will be described in detail.

(Catalyst Ink)

There is no particular limitation to the solvent used as a dispersion medium of the catalyst ink according to an embodiment of the present invention as long as the polymer electrolyte can be dissolved with high flowability or dispersed as micro gel in the solvent while not eating away the catalyst particles or polymer electrolyte. Desirably, the solvent contains at least a volatile liquid organic solvent, and examples of the solvent include, but are not limited to, alcohols such as methanol, ethanol, 1-propanol, 2-propanol, 1-butanol, 2-buthanol, isobutyl alcohol, tert-butyl alcohol, and pentanol, ketone solvents such as acetone, methyl ethyl ketone, pentanone, methyl isobutyl ketone, heptanone, cyclohexanone, methyl cyclohexanone, acetonylacetone, and diisobutyl ketone, ether solvents such as tetrahydrofuran, dioxane, diethylene glycol dimethyl ether, anisole, methoxytoluene, and dibutyl ether, and polar solvents such as dimethylformamide, dimethylacetoamide, N-methylpyrrolidone, ethylene glycol, diethylene glycol, diacetone alcohol, and 1-methoxy-2-propanol. Mixtures of any combination of these solvents can also be used.

The solvent in which lower alcohol is used has a high risk of firing. When such solvent is used, preferably the solvent is used as a mixture with water, and the water highly soluble in polymer electrolyte may be contained. There is no particular limitation to a water additive amount unless the water is separated from the polymer electrolyte to generate white turbidity or turn into a gel.

For the catalyst material (hereinafter also referred to as "catalyst particles" or "catalyst") used in an embodiment of the present invention, metals such as iron, lead, copper, chromium, cobalt, nickel, manganese, vanadium, molybdenum, gallium, and aluminum and alloys, oxides, or multiple oxides thereof can be used in addition to platinum group elements such as platinum, palladium, ruthenium, iridium, rhodium, and osmium. Preferably, the particle diameter of the catalyst ranges from 0.5 nm to 20 nm. When the particle diameter of the catalyst exceeds 20 nm, a surface area of the catalyst is reduced to degrade the power generation performance. When the particle diameter of the catalyst is lower than 0.5 nm, sintering is easily generated to degrade durability of the catalyst. Particularly preferably the particle diameter of the catalyst ranges from 1 nm to 5 nm.

Carbon particles are used as the electron conducting material that loads the above-described catalyst. Any type of carbon particle may be used as long as the carbon particle has a fine-particle shape, conductivity, and a catalyst-resistant property. For example, carbon black, graphite, black lead, activated carbon, carbon fiber, carbon nanotube, and fullerene can be used as the carbon particle. Preferably, the particle diameter of the carbon particle ranges from 10 nm to 1000 nm. When the particle diameter of the carbon particles is lower than 10 nm, the electron conducting path is hardly formed. When the particle diameter of the carbon particles exceeds 1000 nm, the gas diffusion properties of the first electrode catalyst layer 2 and second electrode catalyst layer 4 are decreased to degrade a utilization ratio of the catalyst. Preferably, the particle diameter of the carbon particle ranges from 10 nm to 100 nm. In the catalyst ink of the present invention, the electron conducting material which does not load the catalyst can be used. Particularly the electron conducting material which does not load the catalyst can suitably be used in forming the filler layer. Carbon particles are used as the electron conducting material which does not load the catalyst.

The solid polymer electrolyte contained in the catalyst ink has protonic conductivity, and particularly perfluorosulfonated polymers such as Nafion (product name, registered trademark of DuPont), Flemion (product name, registered trademark of ASAHI GLASS CO., LTD.), and Aciplex (product name, registered trademark of Asahi Kasei Chemical Corporation) can be used as the solid polymer electrolyte. Hydrocarbon electrolytes such as sulfonated PEEK (polyether ether ketone), PES (polyether sulfone), and PI (polyimide) can also be used as the solid polymer electrolyte.

The first electrode catalyst layer 2 including the filler layer 3 and the second electrode catalyst layer 4 can be formed by coating and drying the catalyst inks 2", 3", and 4".

In the filler layer 3 used in an embodiment of the present invention, preferably the polymer electrolyte content ratio obtained by (weight of polymer electrolyte layer 1)/(weight of electron conducting particle) is 1.2 to 5.0 times as large as that of the first electrode catalyst layer 2. When the polymer electrolyte content ratio is lower than 1.2 times, many voids are generated and the filler layer 3 is not formed. On the other hand, when the polymer electrolyte content ratio exceeds 5.0 times, the layer cannot uniformly be coated. Desirably, the polymer electrolyte and the electron conducting particle are included in the filler layer 3. This is because the producing cost can be reduced.

(Substrate S)

For example, a separator, GDL, and glass can be used as the substrate S used in an embodiment of the present invention.

Polymer films such as polyimide, polyethylene terephthalate (PET), polyparabanic acid aramid, polyamide (nylon), polysulfone, polyether sulfone, polyphenylene sulfide, polyether ether ketone, polyether imide, polyacrylate, and polyethylene naphthalate can be used as the substrate S.

Additionally, heat-resistant fluorine resins such as ethylene tetrafluoroethylen copolymer (ETFE), tetrafluoroethylenhexafluoropropylene copolymer (FEP), tetrafluoroperfluoroalkylvinylether copolymer (PFA), and polytetrafluoroethylene (PTFE) can also be used as the substrate S. A polymer film may be bonded onto glass to form the substrate S using a bonding agent.

The substrate S according to an embodiment of the present invention having small center line average roughness Ra is preferably used. Specifically, preferably the center line average roughness Ra is 5 µm or less, more preferably the center line average roughness Ra is 1 µm or less. When the center line average roughness Ra exceeds 5 µm, the first and second electrode catalyst layers 2 and 4 and the polymer electrolyte layer 1 cannot smoothly and stably be coated.

(Electrolyte Ink)

The polymer electrolyte contained in the electrolyte ink used in an embodiment of the present invention has protonic conductivity, and particularly perfluorosulfonated polymers such as Nafion (product name, registered trademark of DuPont), Flemion (product name, registered trademark of ASAHI GLASS CO., LTD.), and Aciplex (product name, registered trademark of Asahi Kasei Chemical Corporation) can be used as the solid polymer electrolyte. Hydrocarbon electrolytes such as sulfonated PEEK (polyether ether ketone), PES (polyether sulfone), and PI (polyimide) can also be used as the polymer electrolyte.

There is no particular limitation to the solvent used as a dispersant of the electrolyte ink in this embodiment of the present invention as long as the solvent never chemically reacts with the catalyst particles and the polymer electrolyte and is able to dissolve or disperse the polymer electrolyte as something like a micro gel in a highly fluid state. It is, however, preferable in the solvent that at least one volatile organic solvent is contained although it is not necessary. Usually, alcohols such as methanol, ethanol, 1-propanol, 2-propanol, 1-butanol, 2-butanol, isobutyl alcohol, t-butyl alcohol and pentanol etc., ketone solvents such as acetone, methyl ethyl ketone, pentanone, methyl isobutyl ketone, heptanone, cyclohexanone, methyl cyclohexanone, acetonylacetone and diisobutyl ketone etc., ether solvents such as tetrahydrofuran, dioxane, diethylene glycol dimethyl ether, anisole, methoxytoluene and dibutyl ether etc., other polar solvents such as dimethylformamide, dimethylacetoamide, N-methylpyrrolidone, ethylene glycol, diethylene glycol, diacetone alcohol and 1-methoxy-2-propanol etc. are used. In addition, solvent mixtures of any combination of these can also be used.

Preferably, the viscosity of the electrolyte ink 1" used in an embodiment of the present invention ranges from 100 cP to 300 cP. When the viscosity of the electrolyte ink 1" is lower than 100 cP, workability is degraded due to the low viscosity. When the viscosity exceeds 300 cP, the uniform film is hardly formed due to the high viscosity.

The polymer electrolyte layer 1 can be formed by coating and drying the electrolyte ink 1".

Preferably, the polymer electrolyte layer 1 has a thickness of 25 µm or less. When the polymer electrolyte layer 1 has the thickness of 25 µm or less, the film resistance can be decreased to improve the power generation characteristic. When the power generation is performed under a low-humidification condition, water generated in an air electrode (cathode) is reversely diffused to wet the polymer electrolyte layer 1, which allows the power generation performance to be easily maintained. From the standpoint of strength of the membrane electrode assembly to be formed, preferably the polymer electrolyte layer 1 has the thickness of 10 µm or more.

Preferably, the first electrode catalyst layer including the first electrode catalyst layer 2 and the filler layer 3 has the thickness of 10 µm or less. When the thickness of the first electrode catalyst layer exceeds 10 µm, the catalyst layer resistance is increased. Preferably, the filler layer has the thickness of 1 µm to 5 µm because the catalyst layer resistance is not increased.

(Fuel Cell)

A fuel cell in which the sequentially stacking type membrane electrode assembly (MEA) according to an embodiment of the present invention is used will be described below.

Figure 2:
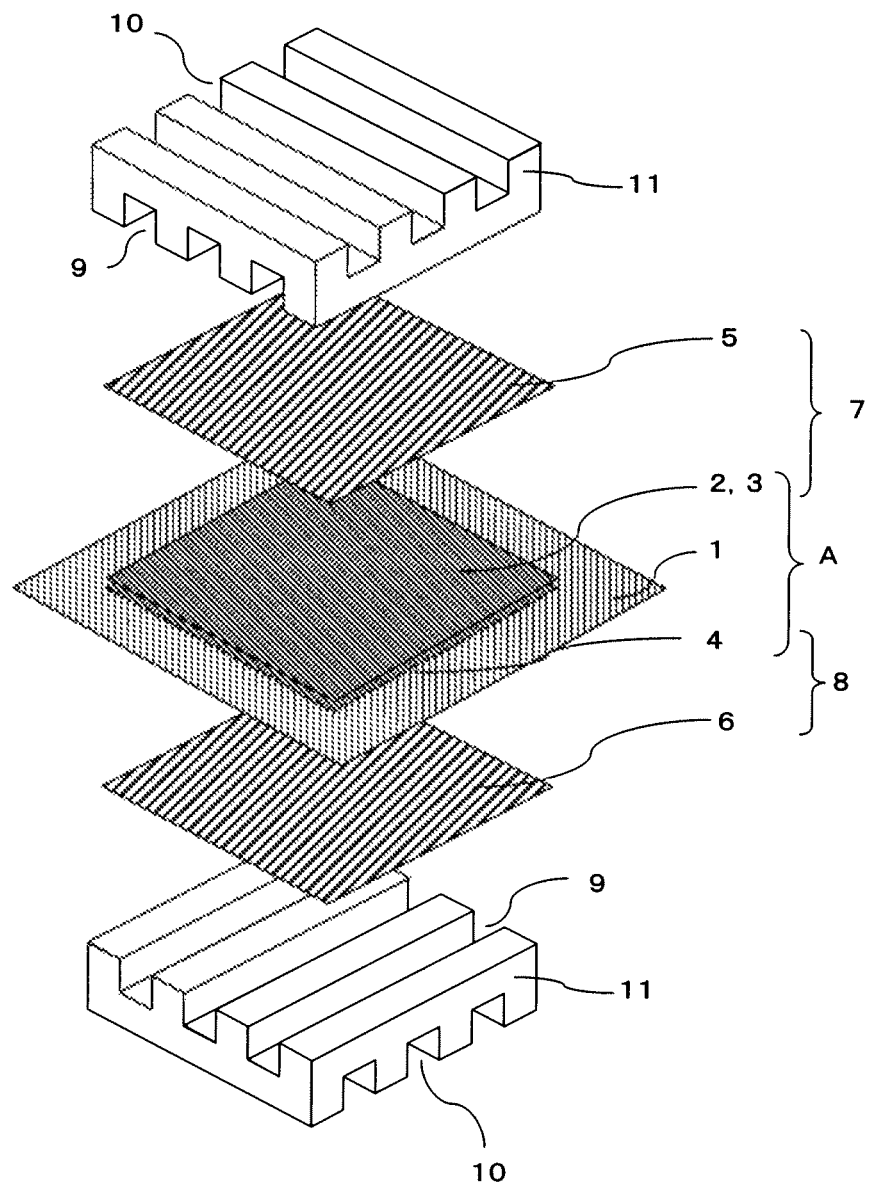
FIG. 2 is an exploded exemplary schematic diagram showing an example of a fuel cell of the present invention.

FIG. 2 is an exploded schematic diagram illustrating a fuel cell according to an embodiment of the present invention. As illustrated in FIG. 2, the first electrode catalyst layers 2 and 3 including the filler layer 3 of the membrane electrode assembly A, a gas diffusion layer on air electrode 6 opposite the second electrode catalyst layer 4, and a gas diffusion layer on fuel electrode 5 are disposed in the fuel cell according to an embodiment of the present invention. Accordingly, an air electrode (cathode) 8 and a fuel electrode (anode) 7 are formed. A set of conductive separators 11 is disposed in the fuel cell. The separator 11 includes a gas flow path 9 through which gas is passed and a cooling water path 10 that is provided in a principal surface to pass cooling water therethrough, and the separator 11 is made of an impermeable material. For example, gas containing hydrogen is supplied as the fuel gas from the gas flow path 9 of the separator 11 on the side of the fuel electrode 7. An electrode reaction is generated between hydrogen and oxygen that is of the gas on the air electrode side in the presence of the catalyst, which allows electromotive force to be generated between the fuel electrode 7 and the air electrode 8.

Figure 3:
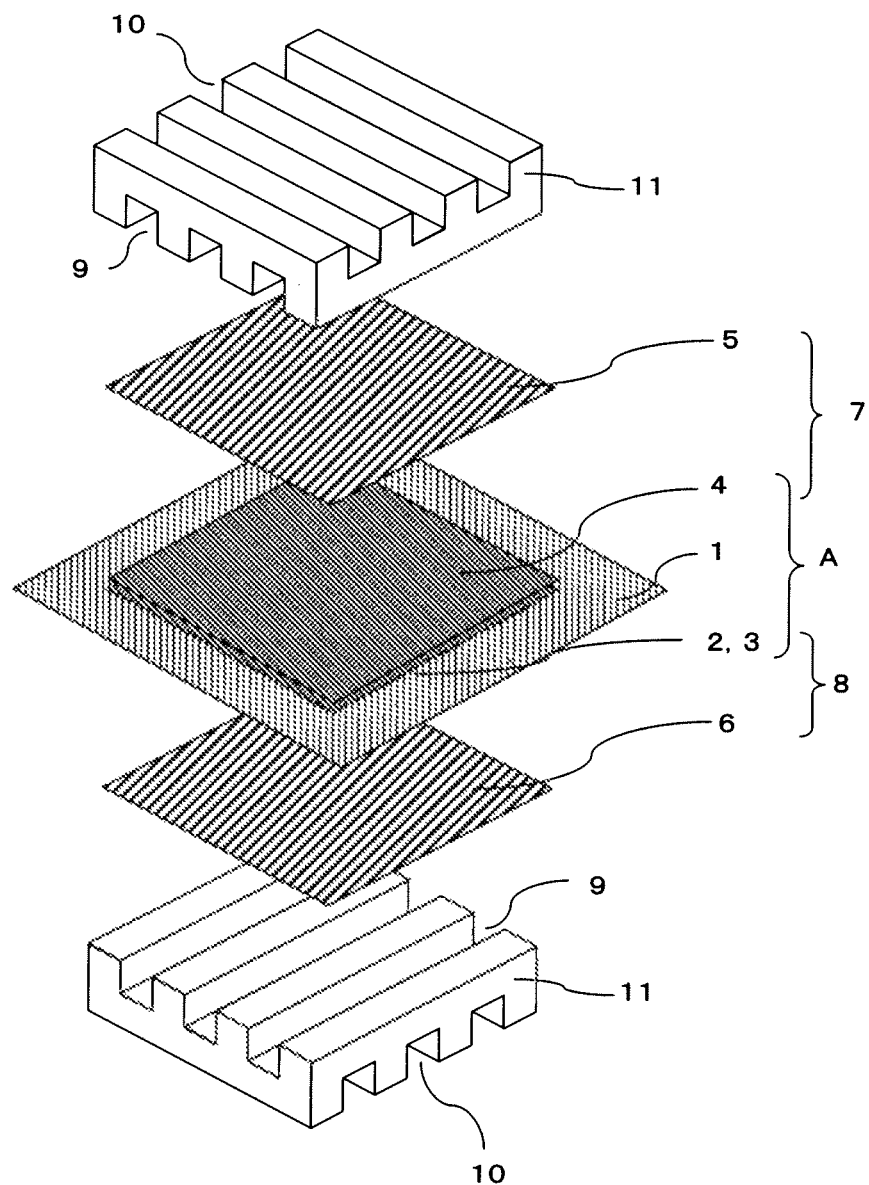
FIG. 3 is an exploded exemplary schematic diagram showing another example of a fuel cell of the present invention.

Although the first electrode catalyst layer 2 and 3 which includes the filler layer 3 in FIG. 2 is arranged on the side of the fuel electrode (anode) and the second electrode catalyst layer 4 on the air electrode (cathode), it is also possible to arrange the second electrode catalyst layer 4 on the fuel electrode (anode) and the first electrode catalyst layer 2 and 3 on the air electrode (cathode) as is shown in FIG. 3.

As illustrated in FIG. 2, the fuel cell has a so-called single cell structure in which the solid polymer electrolyte layer 1, the first electrode catalyst layers 2 and 3 including the filler layer 3, the second electrode catalyst layer 4, the gas diffusion layer on fuel electrode 5, and the gas diffusion layer on air electrode 6 are sandwiched between the set of separators 11. In an embodiment of the present invention, a plurality of cells are stacked with the separator 11 interposed therebetween, thereby forming the fuel cell.

A conductive material having a gas diffusion property can be used as the gas diffusion layer. Specifically, porous carbon materials such as carbon cloth, carbon paper, and nonwoven cloth can be used as the gas diffusion layer. The gas diffusion layer can also be used as the substrate S. At this point, it is not necessary to peel off the substrate S that is of the gas diffusion layer after the bonding process.

When the gas diffusion layer is used as the substrate 5, another filler layer may be formed on the gas diffusion layer before the catalyst ink for first electrode catalyst layer is coated. The filler layer prevents the catalyst ink from seeping into the gas diffusion layer, and the catalyst ink deposits on the filler layer to form a three-phase interface even in the small coating amount of the catalyst ink. For example, carbon particles are dispersed in a fluorine resin solution and the sintering is performed at a melting temperature of the fluorine resin or more, which allows the filler layer to be formed. For example, polytetrafluoroethylene (PTFE) can be used as the fluorine resin.

A carbon type or a metallic type can be used as the separator 11. The gas diffusion layer and the separator 11 may integrally be formed. When the separator 11 or the electrode catalyst layer acts as the gas diffusion layer, the gas diffusion layer may be eliminated.

EXAMPLE

Example

Although an example of the present invention will be described below, the present invention is not limited to the example.

(Adjustment of Catalyst Ink for First Electrode Catalyst Layer 2", Catalyst Ink for Filler Layer 3", and Catalyst Ink for Second Electrode Catalyst Layer 4")

A platinum loading carbon catalyst (trade name: TEC10E50E, product of Tanaka Kikinzoku Kogyo) having a platinum loading amount of 50 weight % and 20 weight % Nafion (registered trademark, product of DuPont) which is polymer electrolyte solution were mixed in the solvent, and a dispersion treatment was performed with a planet ball mill (trade name: Pulverisette 7, product of FRITSCH). A zirconia pot and a zirconia ball were used in the ball mill.

A starting material whose composition ratio was set to 2:1 in terms of a weight ratio of carbon particles of the platinum loading carbon and Nafion was used as the catalyst ink for first electrode catalyst layer 2" and the catalyst ink for second electrode catalyst layer 4". A starting material whose composition ratio was set to 1:2 in terms of a weight ratio of carbon particles that do not load the platinum and Nafion was used as the catalyst ink for filler layer 3".

In the solvent, a volume ratio of methanol and ethanol was set to 1:1.

(Substrate S)

A polymer film (polyethylene tetrafluoroethylen (ETFE)) which was bonded onto the glass using a bonding agent was used as the underlying substrate S.

(Preparation of First Electrode Catalyst Layer 2)

The catalyst ink for first electrode catalyst layer 2" was coated onto the substrate S with a doctor blade, and the catalyst ink for first electrode catalyst layer 2" was dried for 5 minutes to prepare the first electrode catalyst layer 2.

(Preparation of Filler Layer 3)

The catalyst ink for filler layer 3" was coated onto the first electrode catalyst layer 2 with the doctor blade, and the catalyst ink for filler layer 3" was dried for 10 minutes to prepare the first electrode catalyst layer 2 including the filler layer 3. The thickness of the first electrode catalyst layer 2 including the filler layer 3 was adjusted such that the platinum loading amount became about 0.3 mg/cm$^2$.

(Preparation of Polymer Electrolyte Layer 1)

The electrolyte ink 1" was coated onto the filler layer 3 with the doctor blade, and the electrolyte ink 1" was dried for 5 minutes in an oven whose temperature was set at 60° C. immediately after the coating, thereby preparing the polymer electrolyte layer 1. Then, the polymer electrolyte layer 1 was dried for 10 minutes in a drying machine whose temperature was set at 80° C. in vacuum, thereby preparing the polymer electrolyte layer 1. The thickness of the polymer electrolyte layer 1 was set to 25 μm by adjusting a gap with a blade of the doctor blade.

(Preparation of Second Electrode Catalyst Layer 4)

The catalyst ink for second electrode catalyst layer 4" was coated onto the polymer electrolyte layer 1 with the doctor blade, and the catalyst ink for second electrode catalyst layer 4" was dried for 5 minutes to prepare the second electrode catalyst layer 4. The thickness of the second electrode catalyst layer 4 was adjusted such that the platinum loading amount became about 0.3 mg/cm$^2$.

Comparative Example

Substrate S

The polymer film (polyethylene tetrafluoroethylen (ETFE)) which was bonded onto the glass using the bonding agent was used as the underlying substrate S.

(Preparation of First Electrode Catalyst Layer 2)

Similarly to the Example 1, the catalyst ink for first electrode catalyst layer 2" was coated onto the substrate S with the doctor blade, and the catalyst ink for first electrode catalyst layer 2" was dried for 5 minutes to prepare the first electrode catalyst layer 2. The thickness of the first electrode catalyst layer 2 was adjusted such that the platinum loading amount became about 0.3 mg/cm$^2$.

(Preparation of Polymer Electrolyte Layer 1)

Similarly to the Example 1, the electrolyte ink 1" was coated onto the first electrode catalyst layer 2 with the doctor blade, and the electrolyte ink 1" was dried for 5 minutes in the oven whose temperature was set at 60° C. immediately after the coating, thereby preparing the polymer electrolyte layer 1. Then, the polymer electrolyte layer 1 was dried for 10 minutes in the drying machine whose temperature was set at 80°

C. in vacuum, thereby preparing the polymer electrolyte layer 1. The thickness of the polymer electrolyte layer 1 was set to 25 µm by adjusting the gap with the blade of the doctor blade.
(Preparation of Second Electrode Catalyst Layer 4)

Similarly to the Example 1, the catalyst ink for second electrode catalyst layer 4" was coated onto the polymer electrolyte layer 1 with the doctor blade, and the catalyst ink for second electrode catalyst layer 4" was dried for 5 minutes to prepare the second electrode catalyst layer 4. The thickness of the second electrode catalyst layer 4 was adjusted such that the platinum loading amount became about 0.3 mg/cm$^2$. Therefore, the membrane electrode assembly having no filler layer was prepared.
(Power Generation Characteristic)

The pieces of carbon cloth that were of the gas diffusion layers were bonded to the membrane electrode assembly A obtained by peeling off the underlying substrate S, and the membrane electrode assembly A was placed in a power generation evaluation cell (product of NF Corporation). The current and voltage were measured on the following operating condition at a cell temperature of 80° C. with a fuel cell measurement apparatus (trade name: GFI-SG1, product of TOYO Corporation). Hydrogen was used as the fuel gas, air was used as the oxidant gas, and flow rate control was performed with a constant utilization rate. A background pressure was set to 100 kPa. In the humidifier, the anode was set to 100% RH, and the cathode was set to 100% RH.

The power generation characteristics of the membrane electrode assemblies A prepared in the Example and Comparative Example were examined. As a result, compared with the Comparative Example, the flooding was hardly generated in the Example.

Accordingly, in the present invention, the filler layer 3 is formed on the first electrode catalyst layer 2. Therefore, when the polymer electrolyte layer 1 is coated and formed using the electrolyte ink, the polymer electrolyte is prevented from invading in and mixing with the porous first electrode catalyst layer 2, the gas diffusion property is improved, and the power generation characteristic is improved.

INDUSTRIAL APPLICABILITY

The present invention can be applied to a PEFC (PEMFC) which is used in an electric car, a cell phone, a vending machine, an underwater robot, a submarine, a space ship, an underwater transporter or a power supply for an underwater base etc.

What is claimed is:

1. A method for manufacturing a membrane electrode assembly (MEA) comprising:
    coating a catalyst ink for forming a first electrode catalyst layer which comprises a catalyst loaded electron conducting material, a polymer electrolyte and a solvent on a substrate to form a first coated layer;
    evaporating said solvent in said first coated layer to form at least one layer of at least two first electrode catalyst layers which have a difference in polymer electrolyte content ratio;
    coating an ink for forming a filler layer which comprises a no-catalyst loaded electron conducting material or catalyst loaded electron conducting material, a polymer electrolyte and a solvent on said at least one layer of said at least two first electrode catalyst layers to form a coated filler layer;
    evaporating said solvent in said coated filler layer to entirely form said at least two first electrode catalyst layers which have a difference in polymer electrolyte content ratio by forming said filler layer on said at least one layer of said at least two first electrode catalyst layers;
    coating an electrolyte ink which comprises a polymer electrolyte and a solvent on said first electrode catalyst layer to form an electrolyte coated layer;
    evaporating said solvent in said electrolyte coated layer to form a polymer electrolyte layer;
    coating a catalyst ink for forming a second electrode catalyst layer which comprises said catalyst loaded electron conducting material, said polymer electrolyte and said solvent on said polymer electrolyte layer to form a second coated layer; and
    evaporating said solvent in said second coated layer to form a second electrode catalyst layer.

2. The method according to claim 1, wherein
a layer included in said at least two first electrode catalyst layers which is arranged adjacent to said polymer electrolyte layer is said filler layer and has a polymer electrolyte content ratio which is obtained from a formula 1 below and which is 1.2-5.0 times as large as that of another layer included in said at least two first electrode catalyst layers which is arranged adjacent to said substrate, (polymer electrolyte content ratio)=(weight of polymer electrolyte)/(weight of no-catalyst loaded electron conducting material and catalyst loaded electron conducting material)   :<formula 1>.

3. The method according to claim 2, further comprising:
preparing two types of ink in which said no-catalyst loaded electron conducting material or said catalyst loaded electron conducting material and said polymer electrolyte are dispersed in said solvent and which have a difference in a content ratio of said polymer electrolyte to a content of said no-catalyst loaded electron conducting material and said catalyst loaded electron conducting material, wherein
one of said two types of ink which has the lower content ratio of said polymer electrolyte to a content of said no-catalyst loaded electron conducting material and said catalyst loaded electron conducting material is used as said catalyst ink for forming a first electrode catalyst layer, and
the other of said two types of ink which has the higher content ratio of said polymer electrolyte to a content of said no-catalyst loaded electron conducting material and said catalyst loaded electron conducting material is used as said ink for forming a filler layer.

4. The method according to claim 3, wherein
said polymer electrolyte included in said catalyst ink for forming said first electrode catalyst layer is the same as said polymer electrolyte included in said electrolyte ink.

5. The method according to claim 4, wherein
a thickness of said at least two first electrode catalyst layers is 10 µm or less.

* * * * *